(12) United States Patent
Burgin et al.

(10) Patent No.: US 8,096,809 B2
(45) Date of Patent: Jan. 17, 2012

(54) SYSTEM AND METHOD FOR AUTOMATED END-USER SUPPORT

(75) Inventors: Daniel Keele Burgin, Boulder, CO (US); Scott Moore Gosling, Golden, CO (US); David L. Young, Boulder, CO (US); William Randy Watler, Evergreen, CO (US)

(73) Assignee: Convergys CMG Utah, Inc., Salt Lake City, UT (US)

( * ) Notice: Subject to any disclaimer, the term of this patent is extended or adjusted under 35 U.S.C. 154(b) by 1019 days.

(21) Appl. No.: 09/944,676

(22) Filed: Aug. 31, 2001

(65) Prior Publication Data

US 2002/0146668 A1 Oct. 10, 2002

Related U.S. Application Data

(60) Provisional application No. 60/281,637, filed on Apr. 5, 2001.

(51) Int. Cl.
*G09B 11/00* (2006.01)

(52) U.S. Cl. .......................... 434/118; 434/323; 715/705

(58) Field of Classification Search ................... 434/118, 434/307 R, 322, 323, 350, 362, 365; 707/104.1; 705/25, 26; 345/705–713
See application file for complete search history.

(56) References Cited

U.S. PATENT DOCUMENTS

| | | |
|---|---|---|
| 3,829,088 A | 8/1974 | Pahlas |
| 4,451,985 A | 6/1984 | Pullman |
| D276,626 S | 12/1984 | Lockwood |
| 4,567,359 A | 1/1986 | Lockwood |
| RE32,115 E | 4/1986 | Lockwood et al. |
| D286,956 S | 12/1986 | Lockwood |
| 4,793,810 A | 12/1988 | Beasley, Jr. |
| 5,002,491 A | 3/1991 | Abrahamson et al. |
| 5,059,127 A | 10/1991 | Lewis et al. |
| 5,204,813 A | 4/1993 | Samph et al. |
| 5,208,869 A | 5/1993 | Holt |
| 5,211,563 A | 5/1993 | Haga et al. |
| 5,251,268 A | 10/1993 | Colley et al. |
| 5,261,823 A | 11/1993 | Kurokawa |
| 5,267,865 A | 12/1993 | Lee et al. |
| 5,294,229 A | 3/1994 | Hartzell et al. |
| 5,302,132 A | 4/1994 | Corder |
| 5,309,355 A | 5/1994 | Lockwood |
| 5,310,349 A | 5/1994 | Daniels et al. |
| 5,337,141 A | 8/1994 | Egli et al. |
| 5,397,865 A | 3/1995 | Park |

(Continued)

FOREIGN PATENT DOCUMENTS

EP 0 496 492 A1 1/1992

(Continued)

OTHER PUBLICATIONS

A+dvantage—Worldware, 1995, Jostens Learning Brochure.

(Continued)

*Primary Examiner* — Kathleen Mosser
(74) *Attorney, Agent, or Firm* — Frost Brown Todd LLC; William S. Morriss

(57) ABSTRACT

A system and method for displaying content in a browser window associated with an end-user is described. In one implementation, data that includes links is received from a content provider, each of the links is identified and encoded, and the received data along with the links are displayed in the end-user's browser window.

20 Claims, 7 Drawing Sheets

U.S. PATENT DOCUMENTS

| | | | |
|---|---|---|---|
| 5,441,415 A | 8/1995 | Lee et al. | |
| 5,444,774 A | 8/1995 | Friedes | |
| 5,458,494 A | 10/1995 | Krohn et al. | |
| 5,513,991 A | 5/1996 | Reynolds et al. | |
| 5,513,994 A | 5/1996 | Kershaw et al. | |
| 5,576,951 A | 11/1996 | Lockwood | |
| 5,594,791 A | 1/1997 | Szlam et al. | |
| 5,630,025 A | 5/1997 | Dolby et al. | |
| 5,636,036 A | 6/1997 | Ashbey | |
| 5,708,798 A | 1/1998 | Lynch et al. | |
| 5,710,887 A | 1/1998 | Chelliah et al. | |
| 5,721,845 A | 2/1998 | James et al. | |
| 5,727,950 A | 3/1998 | Cook et al. | |
| 5,743,746 A | 4/1998 | Ho et al. | |
| 5,745,765 A | 4/1998 | Paseman | |
| 5,781,914 A | 7/1998 | Stork et al. | |
| 5,788,504 A | 8/1998 | Rice et al. | |
| 5,788,508 A | 8/1998 | Lee et al. | |
| 5,810,605 A * | 9/1998 | Siefert | 434/362 |
| 5,825,651 A | 10/1998 | Gupta et al. | |
| 5,826,031 A | 10/1998 | Nielsen | |
| 5,827,070 A | 10/1998 | Kershaw et al. | |
| 5,844,554 A | 12/1998 | Geller et al. | |
| 5,877,966 A | 3/1999 | Morris et al. | |
| 5,904,485 A | 5/1999 | Siefert | |
| 5,907,706 A | 5/1999 | Brodsky et al. | |
| 5,909,589 A | 6/1999 | Parker et al. | |
| 5,918,217 A | 6/1999 | Maggioncalda et al. | |
| 5,920,848 A | 7/1999 | Schutzer et al. | |
| 5,947,747 A | 9/1999 | Walker et al. | |
| 5,956,709 A | 9/1999 | Xue | |
| 5,963,953 A | 10/1999 | Cram et al. | |
| 5,974,446 A | 10/1999 | Sonnenreich et al. | |
| 5,978,648 A | 11/1999 | George et al. | |
| 6,002,854 A | 12/1999 | Lynch et al. | |
| 6,012,051 A | 1/2000 | Sammon, Jr. et al. | |
| 6,032,129 A | 2/2000 | Greef et al. | |
| 6,035,283 A | 3/2000 | Rofrano | |
| 6,055,569 A | 4/2000 | O'Brien et al. | |
| 6,070,142 A | 5/2000 | McDonough et al. | |
| 6,091,930 A | 7/2000 | Mortimer et al. | |
| 6,162,060 A * | 12/2000 | Richard et al. | 434/118 |
| 6,201,948 B1 | 3/2001 | Cook et al. | |
| 6,237,035 B1 | 5/2001 | Himmel et al. | |
| 6,256,620 B1 * | 7/2001 | Jawahar et al. | 345/705 |
| 6,259,445 B1 * | 7/2001 | Hennum et al. | 345/709 |
| 6,321,209 B1 | 11/2001 | Pasquali | |
| 6,343,329 B1 | 1/2002 | Landgraf et al. | |
| 6,356,284 B1 | 3/2002 | Manduley et al. | |
| 6,427,063 B1 | 7/2002 | Cook et al. | |
| 6,434,619 B1 * | 8/2002 | Lim et al. | 709/229 |
| 6,542,897 B2 | 4/2003 | Lee | |
| 6,553,413 B1 | 4/2003 | Leighton et al. | |
| 6,557,006 B1 * | 4/2003 | Headrick et al. | 707/104.1 |
| 6,658,464 B2 | 12/2003 | Reisman | |
| 6,694,314 B1 | 2/2004 | Sullivan et al. | |
| 6,727,927 B1 | 4/2004 | Dempski et al. | |
| 6,950,852 B1 * | 9/2005 | Kobayaghi et al. | 709/204 |
| 2001/0032140 A1 | 10/2001 | Hoffman | |
| 2002/0052778 A1 | 5/2002 | Murphy et al. | |
| 2002/0118220 A1 | 8/2002 | Lui et al. | |
| 2002/0119435 A1 * | 8/2002 | Himmel et al. | 434/350 |
| 2002/0130895 A1 * | 9/2002 | Brandt et al. | 345/708 |
| 2002/0174106 A1 * | 11/2002 | Martin | 707/3 |
| 2003/0009385 A1 * | 1/2003 | Tucciarone et al. | 705/26 |
| 2003/0164859 A1 | 9/2003 | Evans | |
| 2004/0088345 A1 | 5/2004 | Zellner et al. | |

FOREIGN PATENT DOCUMENTS

| | | |
|---|---|---|
| EP | 0 496 492 B1 | 1/1992 |
| EP | 0 829 996 A3 | 3/1997 |
| EP | 0 829 996 A2 | 3/1998 |
| WO | WO 97/44767 | 11/1997 |
| WO | WO 98/32107 | 7/1998 |
| WO | WO 99/01826 | 1/1999 |
| WO | WO 00/29977 | 5/2000 |

OTHER PUBLICATIONS

Applied Physics, 1995, EduStar America Inc. Brochure.
Aqua Venture, 1995, EduStar America Inc. Brochure.
Barron, 1994, Authoring-Systems Software for Computer-Based Training (Educational Technology Publications, New Jersey) pp. 75-92.
Basic Electronics, 1995, DEGEM Systems Brochure.
Best, 1995, DEGEM Systems Brochure.
Burke, 1994, Authoring-Systems Software for Computer-Based Training (Educational Technology Publications, New Jersey) pp. 123-141.
Carbonell, 1970, IEEE Transactions on Man-Machine Systems 11:190-203.
Cook, 1989, A Briefing for Buyers (Asymtote Inc., Boston).
Educating Jessica's Generation, 1995, Jostens Learning Brochure.
EduStar Mathematics, 1995, Innovative Technologies in Education Brochure.
Fall, III, 1994, Authoring-Systems Software for Computer-Based Training (Educational Technology Publications, New Jersey) pp. 143-164.
Guttman et al., 1998, "Agent-mediated electronic commerce: a survey," *The Knowledge Engineering Review 13*(2):147-159.
Hello Blue Planet, 1995, EduStar America Inc. Brochure.
Hibbard, Justin, (Apr. 12, 1999), Assembly Online: The Web is changing mass production into mass customization, Information Week Online: News and Reviews (Online) Available Web Site: www.informationweek.com/729/build.htm; Accessed on: Oct. 30, 2001.
Home Reach, 1995, Computer Curriculum Corporation Brochure.
Keller, 1968, j. Applied Behavior Analysis 1:79-89.
Kimball, 1995, Educational Leadership 53:54-56.
Kulik et al., 1983, J. Educational Psychology 75:19-26.
Kulik et al., 1986, J. Educational Computing Research 2:235-252.
Lamb, 1994, Authoring-Systems Software for Computer-Based Training (Educational Technology Publications, New Jersey) pp. 24-44.
Learning First—New Edition, 1995, Jostens Learning Brochure.
Lesser, 1995, ACM Computing Surveys 27:340-342.
Lindsley, 1990, Teaching Exceptional Children 22:353-359.
Maes, 1994, Communications of the ACM 37:31-40.
Meet Lightspan, 1996, Lightspan Brochure.
O'Keefe and McEachern, 1998, "Web-based Customer Decision Support Systems," *Communications of the ACM 41*(3):71-78.
Osin, 1984, Proc. 4$^{th}$ Jerusalem Conf. on Information Technology, pp. 418-424.
Pasik, Alexander J. (Sep. 24, 1998), the Software Investor, *The Configuration Invasion.*
Peha, 1995, Educational Leadership 53:18-25.
Plato Learning System, 1995, TRO Learning, Inc. Brochure.
SageTalk: *Designing a Tool for Designing Successful Web-based Social Agents* (Paper ID 214); Conference '00, Month 1-2, 2000.
Sherry and Komoski, eds., 1990, The IIS Report pp. 3-6, 21-24, 52, 256-260.
Vaas, Lisa (May 17, 1999), *Service Sites Buckle Up Configurators,* PC Week Online (Online) Available Web Site: www.zdnet.com/pcweek/stories/news/0,4153,402639,00.html; Accessed on: Oct. 30, 2001.
Venezky and Osin, 1991, The Intelligent Design of Computer-Assisted Instruction (Longman, New York) chapters 3 and 7-13.
Writing Expedition, 1994, Ideal Learning Brochure.
Poleretzky Z et al: "The Call Center & e-Commerce Convergence" Dialog ABI/Inform(R), XP002949410 2001.
Attardi G et al: "Web-based Configuration Assistants" Artificial Intelligence for Engineering Design, Analysis and Manufacturing, London, GB, vol. 12, No. 4, Sep. 1998 pp. 321-331, XP002902516.
Brader, 1994, Authoring-Systems Software for Computer-Based Training (Educational Technology Publications, New Jersey) pp. 45-60.
(Author Unknown); "Best: Basic Education Software Tool"; DegemSystems.
Lindsley, Orgen R.; "Precision Teaching: By Teachers for Children"; Teaching Exceptional Children; pp. 10-15; Spring 1990.

Lansford, Wendell; "Real-time, interactive sales and services across the Internet: Optimizing the customer experience", Dialog/Inform(R), XP002949411 2001.

Office Action dated Jul. 21, 2005 for U.S. Appl. No. 09/944,836, filed Aug. 31, 2001.

Office Action dated Jan. 4, 2005 for U.S. Appl. No. 09/944,836, filed Aug. 31, 2001.

Office Action dated Dec. 15, 2005 for U.S. Appl. No. 09/944,836, filed Aug. 31, 2001.

Office Action dated Jan. 17, 2008 for U.S. Appl. No. 09/944,836.

Final Rejection dated Aug. 8, 2008 for U.S. Appl. No. 09/944,836.

Office Action dated Jul. 24, 2009 for U.S. Appl. No. 11/749,983.

Office Action dated Mar. 4, 2010 for U.S. Appl. No. 11/751,851.

Office Action dated May 27, 2011 for U.S. Appl. No. 11/751,976.

Final Office Action dated Jul. 13, 2010 for U.S. Appl. No. 11/198,934.

Final Office Action issued against U.S. Appl. No. 11/749,983 dated Jul. 22, 2010.

Office Action dated Nov. 26, 2010 for U.S. Appl. No. 11/751,976.

* cited by examiner

SYSTEM AND METHOD FOR AUTOMATED END-USER SUPPORT

PRIORITY

This application claims priority from the U.S. Provisional Patent Application No. 60/281,637, entitled Integrated Automated and Live Electronic Customer Service Application and Method, filed on Apr. 5, 2001.

RELATED APPLICATIONS

This application is related to the following commonly owned and assigned U.S. patents, all of which are expressly incorporated herein by reference:

U.S. Pat. No. 6,201,948, entitled Agent Based Instruction System and Method, and U.S. Pat. No. 5,727,950, entitled Agent Based Instruction System and Method.

FIELD OF THE INVENTION

The present invention relates to automated, end-user support systems. In particular, but not by way of limitation, the present invention relates to systems and methods for integrating live end-user support with automated support.

BACKGROUND OF THE INVENTION

The Internet and ecommerce Web sites are radically altering the way that many businesses operate. In particular, ecommerce Web sites are altering the relationship between buyers and sellers. Sellers, for example, can realize substantial cost savings by moving buyers from their brick-and-mortar stores to their ecommerce Web sites. Unfortunately, the full potential of these ecommerce Web sites is not being realized because of poor customer experiences while using them.

Statistics show that the majority of sales initiated on an ecommerce Web site are abandoned before completion. Often these transactions are abandoned because the customer has reached some impasse such as a site navigation problem or an unanswered product question. Some businesses address these customer issues by providing live customer support. Live customer support, however, is relatively expensive and, thus, negates much of the cost savings offered by ecommerce. Additionally, when live customer support only provides for email response, customers often abandon transactions before receiving an email response.

Because live customer support is relatively expensive, many businesses elect to use online, non-live support either exclusively or in conjunction with some type of live help. Most of these types of non-live support systems are form-based instruction manuals. In other words, the customer is given a list of frequently asked questions (FAQs) from which to select. Assuming that the customer's question is in the list of FAQs, these types of support systems return the corresponding answer in a text-based format. Rather than navigate such an instruction manual, many users simply terminate the transaction or contact the live customer support. In either case, the business associated with the ecommerce Web site loses important revenue.

Some non-live support systems attempt to present an animated character to address the customer's issues. These characters are generally little more than animated instruction manuals and lack the "look and feel" of live help. Again, rather than deal with such an annoying and unhelpful character, many customers terminate the transaction or contact live customer support. Moreover, these present systems are generally rigid and typically cannot be easily transported from one ecommerce site to another. Thus, these present non-live systems are not only unsatisfactory from the customer's perspective, they are expensive to develop and modify from the ecommerce business's perspective.

As ecommerce becomes more competitive, successful businesses will retain a higher percentage of customers while spending a minimum amount of money on customer support. Businesses are losing precious revenues because present technologies do not sufficiently minimize customer support costs while retaining customers. Accordingly, a system and method are needed to address the above-mentioned and other shortfalls in present technology.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In one embodiment, the present invention, provides a system and method for integrating an intelligent, automated support system with a live support system to thereby provide economical end-user support. For example, such a system could include a live support system, an automated support server, and a knowledge database. Other implementations can also include report modules and data collection modules.

In one implementation, the automated support server can provide both just-in-time help and/or cobrowsing through an automated agent that is displayed in the end-user's browser window. (Note that the end-user can include both customers and any other type of user.) The just-in-time help is initiated by the end-user and is used to address a particular problem that the end-user might have. For example, as an end-user navigates a Web site, questions may arise regarding a product. The end-user can activate the automated agent associated with the Web site to find an answer to that question. Once the automated agent has answered the question, the automated agent can be terminated.

Alternatively, the automated agent can cobrowse with the end-user. In this cobrowsing implementation, the automated agent does not merely answer a question and then go away. Rather, in a cobrowsing situation, the automated agent is persistently with the end-user while the end-user navigates the corresponding Web site. For example, the automated agent could cobrowse with the end-user to aid the end-user in configuring a new computer. The automated agent would collect information regarding the intended uses for the computer, budget constraints, and other helpful information and would make recommendations based upon that collected information. When the end-user selects a particular monitor, for example, the cobrowsing automated agent can automatically recommend an appropriate driver card or recommend a different monitor that better addresses the end-user's needs.

Whether operating in just-in-time mode or in cobrowsing mode, the automated agent can be configured to receive data from the end-user and to respond accordingly. In other words, the automated agent can behave much like a live agent. To simulate a live agent, the automated agent can assume one of a series of roles. For example, the automated agent could be assigned a greeting role, an orientation role, a customer support role, a process accompaniment role, etc. These roles are reusable units that define the goal of the automated agent and the bounds of its behavior.

Each role can include a set of skills that manage the exchange of data between the end-user and the automated agent. Skills can be separated into two categories: social skills and input/output (I/O) control. Social skills provide the automated agent with lifelike characteristics such as speech, gestures, mannerisms, memory and movements. The I/O control provides the automated agent with the ability to retrieve data responsive to actions by the end-user, manipulate that data as needed and provide it to the end-user in a usable form. For example, the automated agent could include an order-status-retrieval skill that retrieves order-status data from a shipping database responsive to a request from the end-user and informs the end-user of the relevant order status.

Based upon input from the end-user, an appropriate skill associated with the automated agent can also access a knowledge database and determine a response that addresses the end-user's question. The appropriate response may include a single step of providing an answer to a frequently asked question or it may include a multi-step, multi-branch action that guides the end-user through a series of actions. For example, if the end-user needs help in configuring a new computer, the knowledge database may contain a configuration tree of all the possible configurations. As the end-user selects one option, the automated agent, through a configuration skill, can navigate the tree to present the end-user with the next set of options. Based upon the end-user's intended uses and/or budget, the automated agent can identify preferred options within each set of options.

In one embodiment, when the automated agent cannot address the end-user's questions or when alternative support is more appropriate, an alternative support session, e.g., a live support session, a prerecorded support session, an email response, a chat session, etc., can be initiated either by the automated agent or by the end-user. Any data collected or used by the automated agent can be passed, for example, to the live agent, thereby providing a somewhat seamless transition from the automated agent to the live agent. Additionally, the automated agent can pass to the live agent any data related to the automated agent's attempts to address the end-user's questions.

After the live agent has addressed the end-user's questions, the live agent can pass the end-user back to the automated agent. Just as if the automated agent were a live agent, the automated agent can remember the end-user and the end-user's previous support sessions. In certain embodiments, the automated agent is even aware of the actions that the live agent initiated to address the end-user's questions, thereby allowing the automated agent to resume a support session at the proper point.

In one implementation, questions addressed by the live agents are recorded and used to improve the knowledge database so that the automated agent can address those issues in the future without the aid of a live agent. For example, if a particular question is repeatedly referred from the automated agent to the live agents, that question and corresponding answer can be added to the knowledge database. The next time that the automated agent is presented with that question, it can retrieve the proper answer from the knowledge database and not involve the live agent. Alternatively, if that question and answer are already in the knowledge database, the placement of that question relative to other issues addressed by the automated agent can be changed. For example, the question and answer can be added to a list of frequently asked questions that is presented immediately by the automated agent.

Although the present invention is generally described with regard to product sales, it should not be limited thereto. The end-user support described above can be used in virtually any industry. For example, the automated agent could be used by the financial industry, the service industry, and the like. Moreover, the automated agent need not be Web based. In some embodiments, the automated agent is loaded directly onto an end-user's computer. From there, the automated agent can, for example, troubleshoot software and hardware issues.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
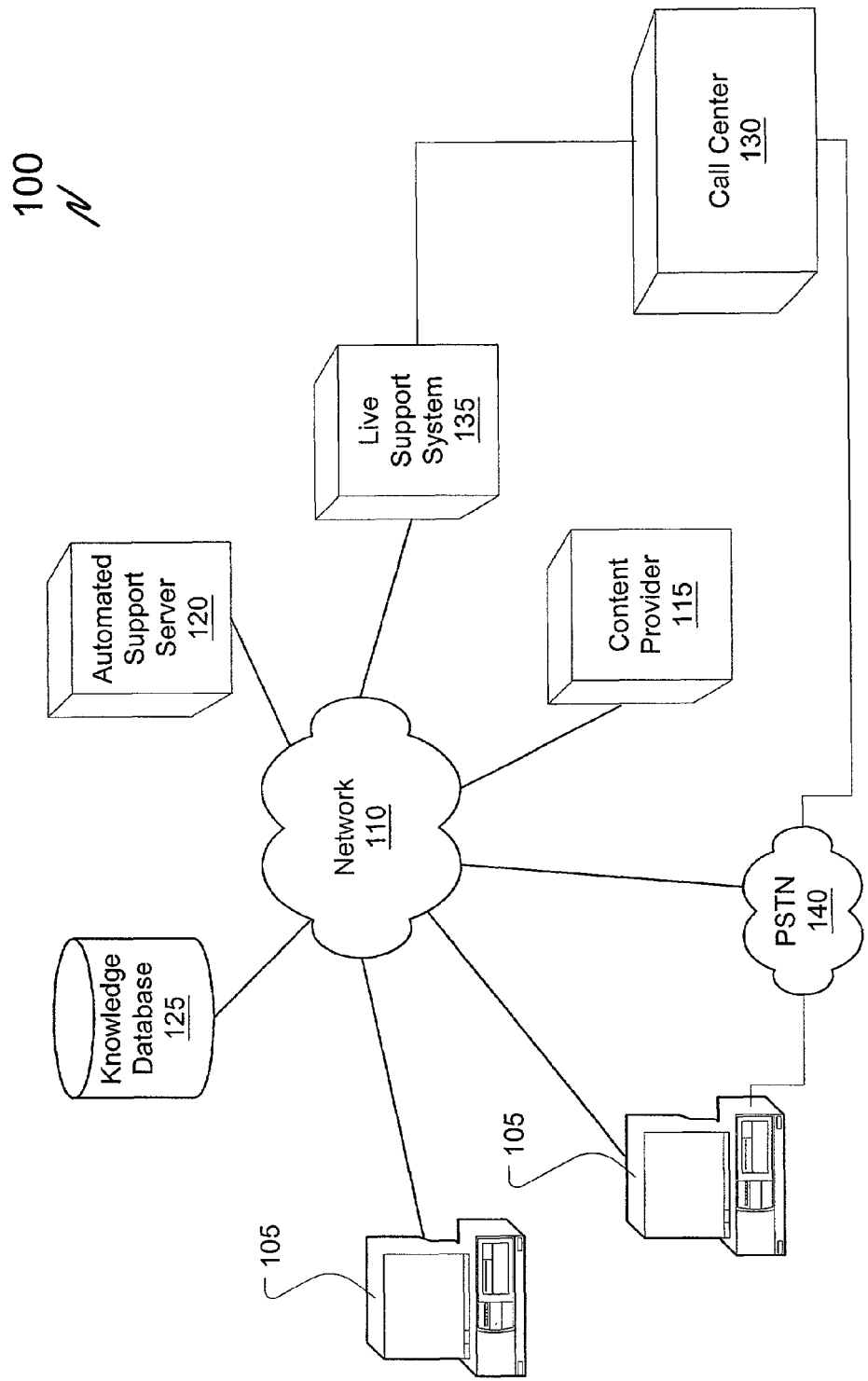
FIG. 1 illustrates a system constructed in accordance with an embodiment of the present invention.

Referring now to the drawings, where like or similar elements are designated with identical reference numerals throughout the several views, and referring in particular to FIG. 1, there is illustrated a system 100 constructed in accordance with the principles of the present invention. This system 100 includes a plurality of end-users 105 connected through a network 110, such as the Internet, to a content provider 115, such as an ecommerce Web site. Any of the end-users 105 can access the content provider 115 through the network 110, and when necessary, an end-user 105 can also access an automated support server 120 for support. In one implementation, automated support 120 is manifested by an automated agent that is displayed in the end-user's browser window in conjunction with content from the content provider 115.

The automated agent is preferably generated by the automated support server 120 and is generally aware of the end-user's personal information, metadata associated with the content provider 115, the end-user's navigation location within a Web site, and navigation events initiated by the end-user 105. For example, if the end-user 115 follows a particular link in a Web page provided by the content provider 115, the automated agent—via the automated support server 120—can be aware of that fact and can also be aware of the next page from the content provider 115 that will be displayed for the end-user 105. Through this awareness of navigation events, the automated agent provides the end-user with an interactive and intelligent support session rather than just a list of questions and answers.

To generate the automated agent and to drive its interaction with the end-user 105, the automated support server 120 can use information stored in the knowledge database 125. This information can include data about the end-user 105, predefined character traits of the automated agent, and/or interaction management data. Further, this type of information can include role definitions and skill definitions. For example, the automated agent can be associated with a particular role such as greeter, product advisor, process accompaniment, customer service, etc., that define the boundaries of the automated agent's behavior. Each of these roles includes a possibly distinct set of skills that manage the automated agent's interaction with the end-user 105. One set of skills might define the social aspects of the automated agent and another set of skills might manage the flow of data between the automated agent, the knowledge database 125, and the end-user 105. For example, a "get order status" skill could retrieve order information from the end-user 105, pass that information to the knowledge database 125, receive corresponding order status information from the knowledge database 125, and provide that order status information to the end-user 105.

If the end-user 105 needs additional help or if the automated agent determines that an alternative support session is necessary or would be beneficial, the automated agent can automatically escalate the help session to involve, for example, live agents at a call center 130 or at any other location. The live support session could be conducted through the live support server 135 with video and/or audio streaming, chat sessions, Voice-over-IP channels, and/or email. The live support sessions can also be conducted through a traditional phone call routed to the call center 130 through, for example, a public switch telephone network (PSTN) 140.

When a live help session is initiated, the live agent can access the knowledge database 125 and/or the automated support server 120 to collect data about the end-user 105 and the end-user's session with the automated support server 120. Accordingly, the transition from the automated agent to the live agent can be somewhat seamless. Additionally, the live agent can work in conjunction with the automated agent to address the end-user's questions. In this implementation, the automated agent could run in the background and not be visible to the end-user 105. Even though it is not necessarily visible, the automated agent can gather information, for example, about the end-user's present location within a Web page and subsequent navigation events. This information can be passed to the live agent to provide a more complete understanding of the end-user's situation.

Additionally, once the live agent has addressed the end-user's question, the end-user 105 can be passed back to the automated agent, i.e., the automated support server 120. The automated agent can remember the end-user's previous session and interact with the end-user 105 accordingly. In some implementations, the automated agent can even be provided with details related to the end-user's interaction with the live agent. Thus, the transition from the live agent back to the automated agent could appear virtually seamless to the end-user 105.

To improve the responsiveness of the automated agent, details regarding end-users' sessions can be logged and analyzed. In particular, the details regarding the interaction between live agents and end-users 105 can be logged and analyzed. For example, when the automated agent refers an end-user 105 to a live agent, the question raised by the end-user 105 can be recorded. This question and a corresponding answer can then be added to the knowledge database 125 so that the automated agent can answer the question in the future without the aid of a live agent. In other implementations, an event record is created when an end-user 105 terminates the automated agent before the end-user's question is addressed. These event records can be aggregated to determine if the automated agent is being unresponsive and to determine what updates should be made to the knowledge database 125 or to the automated support server 120.

Figure 2:
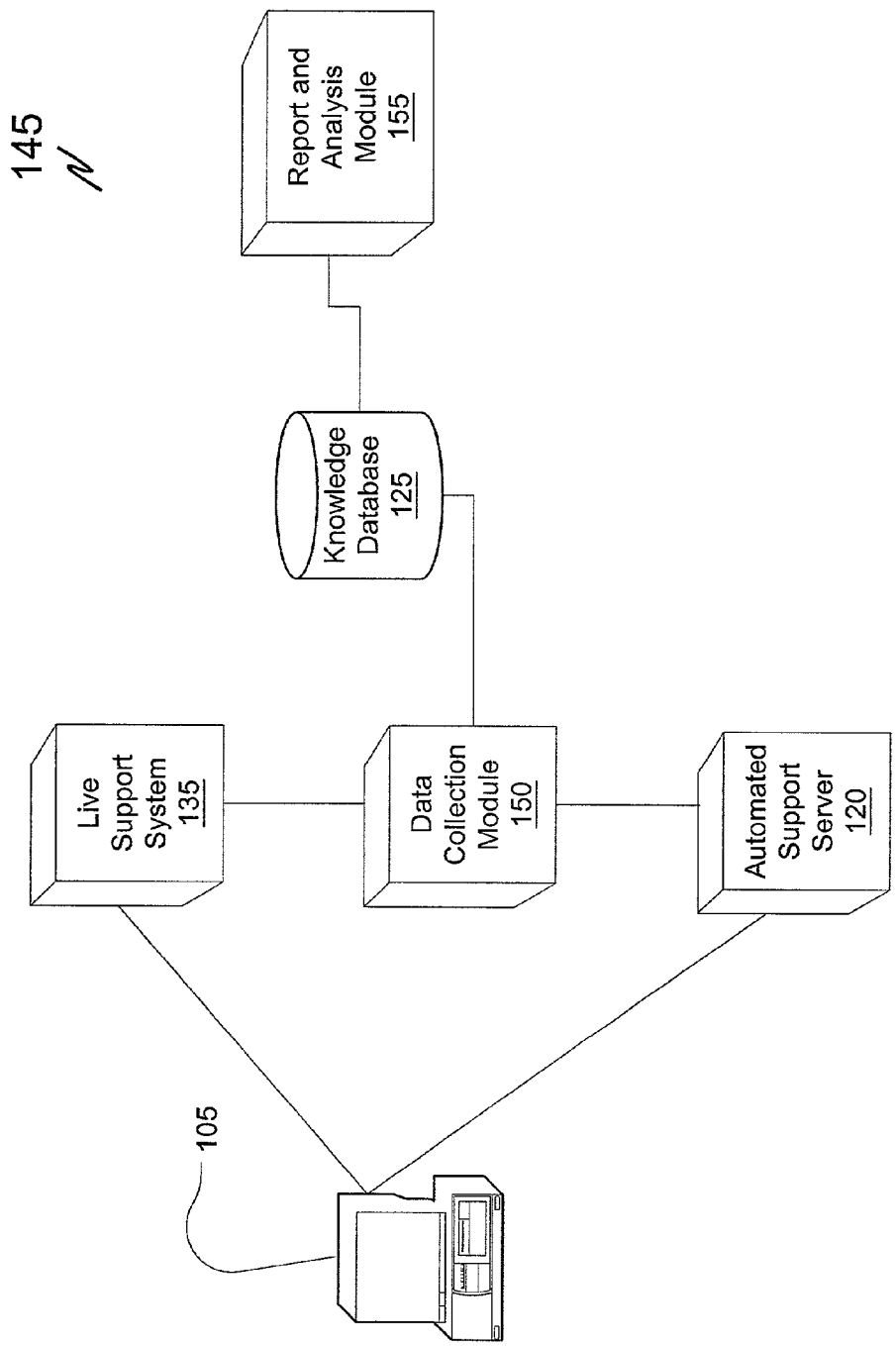
FIG. 2 illustrates an alternate system also constructed in accordance with an embodiment of the present invention.

Referring now to FIG. 2, it illustrates another implementation of a system 145 constructed in accordance with the principles of the present invention. In this system 145, an end-user 105 can connect either to the live support system 135 (could also connect to the call center 130) or to the automated support server 120. Both systems 120 and 135 have access to the knowledge database, which as previously described, can contain information about the content provider's Web site, the end-user 105, and/or interaction management instructions. Thus, both the live support system 135 and the automated support system 120 have access to similar information when addressing an end-user's questions. For example, a live agent—through the live support system 135—could access the same set of interaction management instructions to address an end-user's question as would the automated agent—through the automated support server 120. Although the knowledge database 125 is shown as a single element, those of skill in the art can understand that the knowledge database 125 can be arranged in a variety of ways including a multi-device, distributed storage system and a multi-device independent storage system.

As (or after) the end-user 105 interacts with the live support system 135, data regarding the interaction can be collected and recorded in the data collection module 150 by the report and analysis module 155. This information can be analyzed to identify needed enhancements to the automated support server 155. For example, the report and analysis module 155 can determine that a new frequently asked question and its corresponding answer should be added to the knowledge database 125, thereby allowing the automated agent to answer that question without the aid of a live agent. In other implementations, the report and analysis module 155 can recommend enhancements to the live support system 135, network configurations, marketing tactics, automated agent presentations, etc. Additionally, the report and analysis module 155 can track usage of the automated support server 120 and/or live support system 135 for modeling and/or billing purposes.

Figure 3:
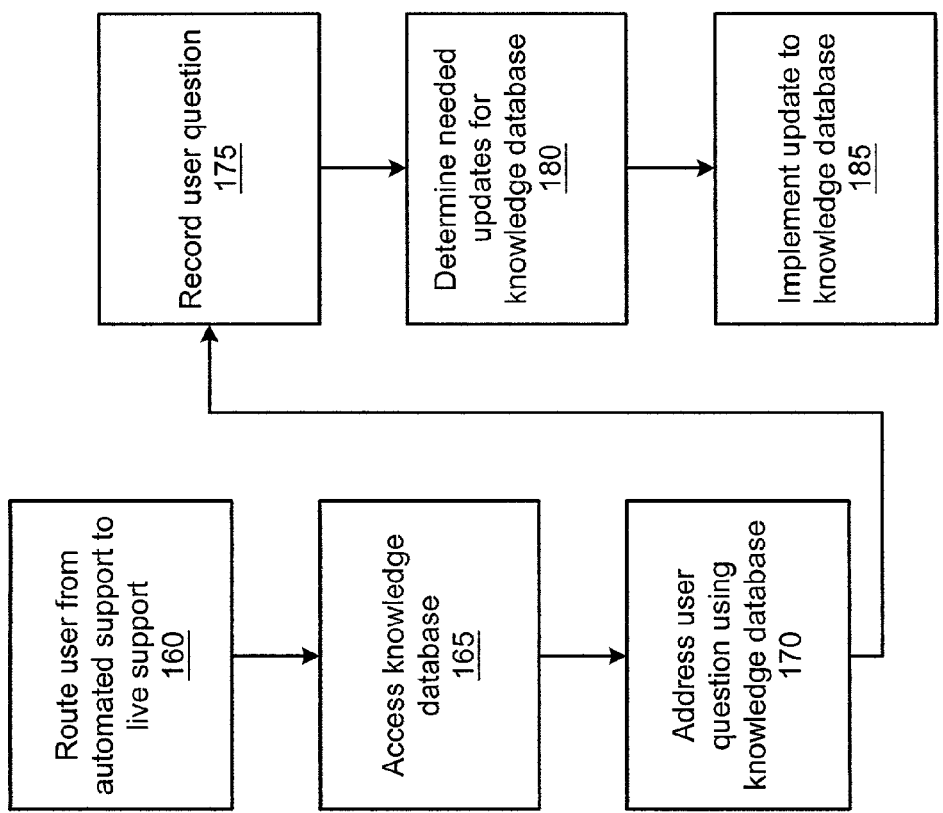
FIG. 3 is a flowchart showing one method of operating the system shown in FIG. 2.

Referring now to FIG. 3, it shows a method of operating the system 145 shown in FIG. 2. In this implementation, an end-user 105 is routed from the automated agent at the automated support server 120 to a live agent at the live support system 135 (step 160). The live support system 135 then accesses the knowledge database 125 and retrieves any information relating to the end-user 105, the user's interaction with the automated agent, and/or the user's present location within the content provider's Web site (step 165). Alternatively, the automated support server 120 could initiate the transfer of this data to the live support system 135. In either case, the data available to the automated agent is generally available to the live agent. If not available in the retrieved information, the live agent determines the user's questions and addresses them according to either an interaction management plan—possibly stored in the knowledge database 125—or personal experience (step 170).

The end-user's question, its answer, and any appropriate comments can then be recorded in the data collection module 150 (step 175). When a meaningful sample of questions has been collected, the report and analysis module 155 can retrieve necessary data from the data collection module 150 and determine if any of the questions being handled by the live support system 135 are better suited for the automated support server 120 (step 180). If so, an update for the automated support server 120 is identified and implemented (step 185). Likewise, the report and analysis module can create an improved plan for live agents to address particular questions.

Figure 4:
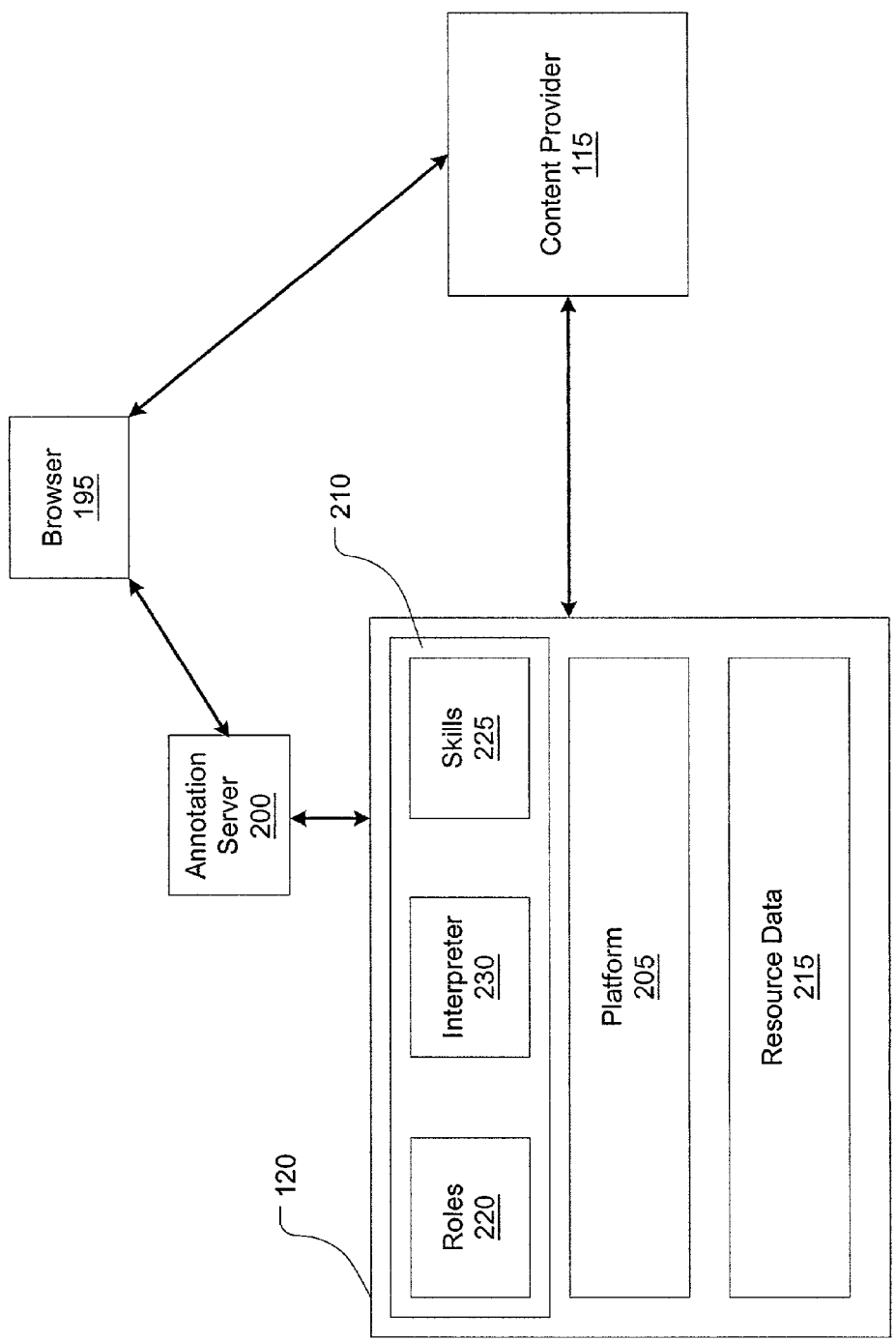
FIG. 4 illustrates yet another system constructed in accordance with an embodiment of the present invention.

Referring now to FIG. 4, it illustrates an alternate implementation of a system 190 constructed in accordance with the principles of the present invention. This embodiment includes a Web browser 195 (representing the end-user 105) connected to the content provider 115 and the automated support server 120. The browser 195 is also connected to an annotation server 120 that is responsible for masking addresses so that the automated agent and the content from the content provider 115 can appear simultaneously within a single browser frame set and exchange information despite the fact that the automated agent and the content, from the content provider 115, originate from different domains. Moreover, the automated agent can manifest itself in the browser window using a variety of ways including a Java applet, a flash player, or traditional HTML techniques.

Still referring to FIG. 4, the automated support server 120 of this implementation includes three basic components: a platform 205, a profiler application 210, and resource data 215. The automated support server 120 can be implemented on many types of hardware including Sun Microsystems based systems, Microsoft based systems, and Linux based systems. Additionally, the various components of the automated support server can be distributed across one or more hardware platforms or otherwise arranged in a distributed fashion.

The profiler application 210 of the automated support server 120 includes a roles module 220, a skills module 225, and an interpreter module 230. The roles module 220 includes reusable definitions for each role that an automated agent can be assigned. Similarly, the skills module 225 includes the definitions for each skill that can be assigned to a role. The interpreter module 230 is responsible for invoking the appropriate role and skill in response to end-user 105 initiated events. For example, the interpreter module 230 could initially invoke a greeting role for the automated agent and assign the appropriate skills to that role.

The actual character definitions, social rules, character dialogue, and other relevant data are contained in the resource data module 215, which generally corresponds to at least portions of the knowledge database 125 of FIG. 1. To execute a particular skill, the platform 205 bridges between the profiler application and the resource data module 215 to retrieve the necessary data. For example, one dialogue contained in the resource data 215 could be called "formal greeting" and be associated with the phrase "Hello Sir, I will be your guide today," and another dialogue could be called "informal greeting" and be associated with the phrase "Let me show you around." The same role, "site orientation," and the same skill, "speak greeting," could invoke either dialogue based upon data about the end-user 105. In other words, if the end-user 105 is, for example, under 30 then the "speak greeting" skill could use the informal greeting. Otherwise the "speak greeting" skill could use the formal greeting. By modularizing the profiler application 210 and the resource data 215 in this way, the automated agent can be easily adapted to handle new roles, new skills, new dialogue, and new visual characteristics. Additionally, this type of modularization allows for an automated support server 120 to be quickly and efficiently customized for different content providers.

Figure 5:
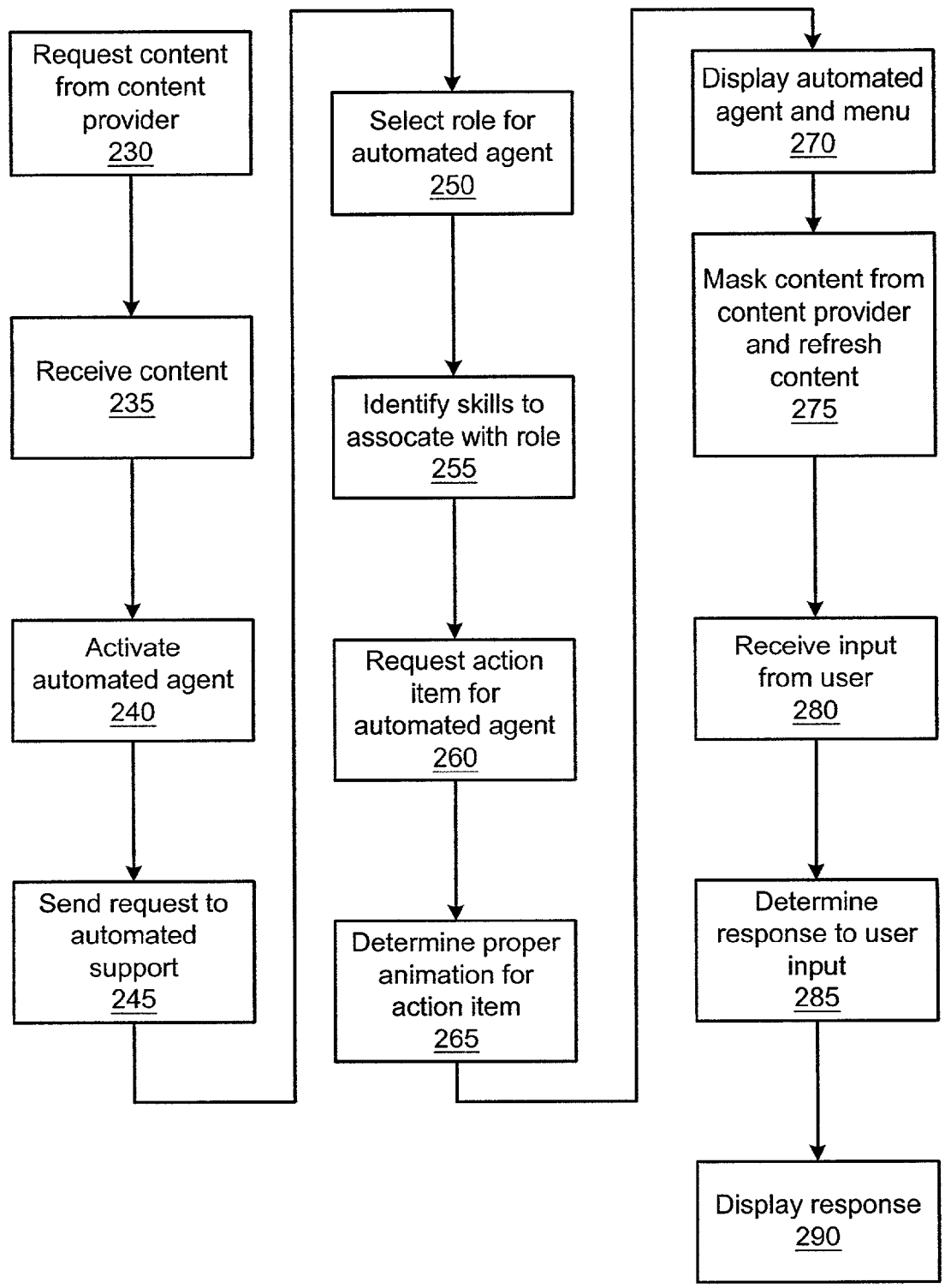
FIG. 5 is a flowchart showing one method of operating the system shown in FIG. 4.

Referring now to FIG. 5, it is a flowchart of one method of operating the system shown in FIG. 4. In this implementation, an end-user 105, through a browser 190, requests and receives content from the content provider 115 (steps 230 and 235). This content generally includes a link—possibly in the form of an icon—to the automated agent. When in need of assistance, the end-user 105 selects the link to the automated agent, and, in response, the browser 195 sends a fetch request to the automated support server 120 for the data associated with the automated agent (steps 240 and 245). Next, the automated support server 120 identifies the appropriate role for the automated agent and loads the skills associated with that role (steps 250 and 255). Next, the action item for the automated agent is identified (step 260). For example, the action item could be to invoke the "look busy" skill. The automated support server 120 can then use the action item, role, and/or skills to determine the proper animation for the automated agent and display the automated agent along with the proper animation on the browser window (steps 265 and 270).

Additionally, the automated support server 120 can cause the content from the content provider 115 to be refreshed (step 275). However, to circumvent the consistent page domain security requirement, the annotation server 200 masks the content from the content provider 115 so that it appears to originate from the same domain as the automated agent (step 275). This masking process is described in greater detail with relation to FIG. 6.

In addition to displaying the automated agent alongside the content from the content provider 115, the automated support server 120 can also display a list of options on the browser window from which the end-user 105 can choose. Responsive to the end-user 105 choosing one of the listed options, the automated support server 120 can access the resource data 215 within the automated support server 120 and determine the proper response (steps 280 and 285). That response can be displayed in the browser window (step 290).

Figure 6:
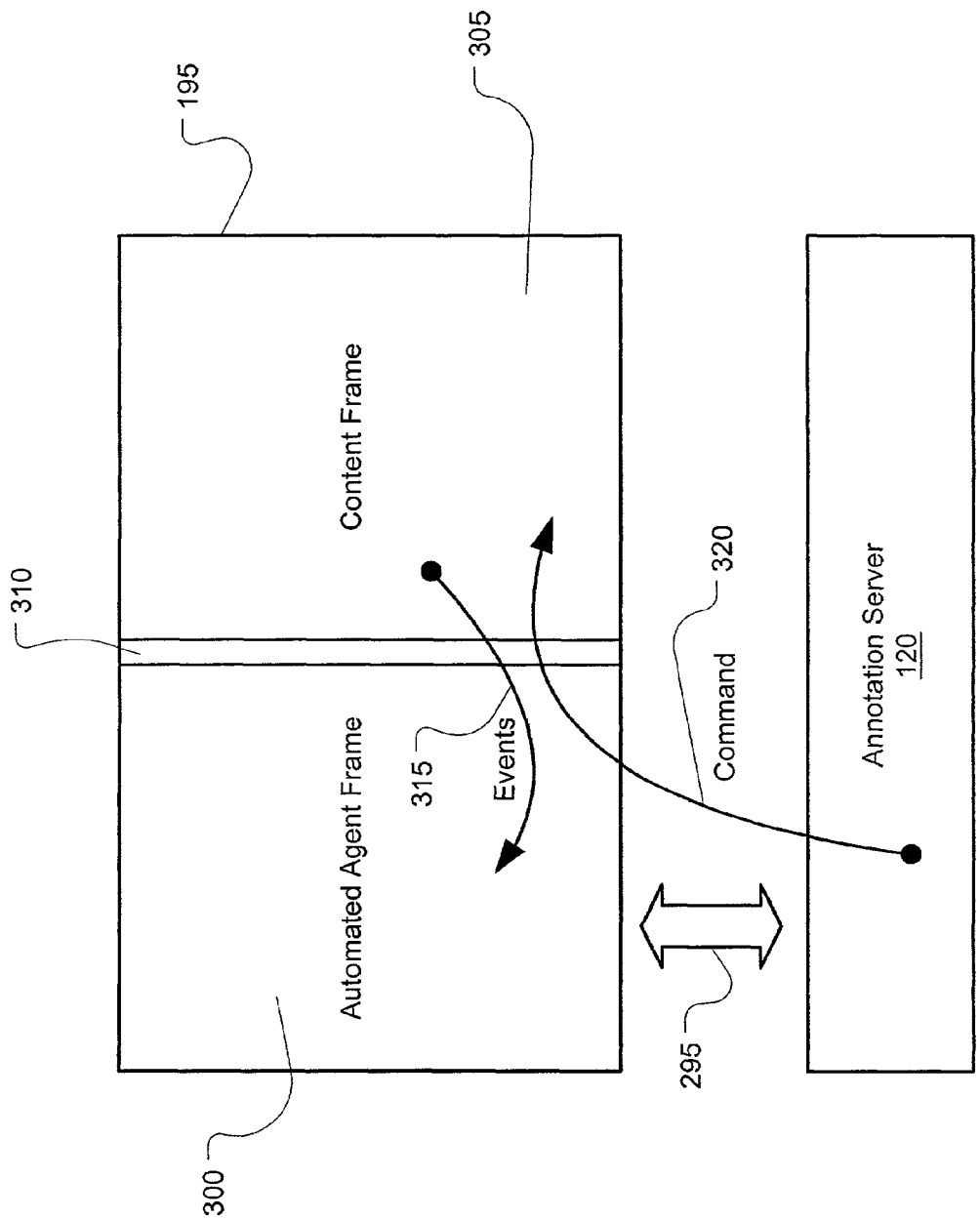
FIG. 6 illustrates the interaction of the annotation server and the browser.

Referring now to FIG. 6, it illustrates the interaction of the annotation server 120 and the browser 195, which can communicate with each other, for example, through HTTP tunneling 295. In this embodiment, the browser 195 displays two frames: the automated support frame 300 and the content frame 305. Other frames could be used to display menus and/or dialogue associated with the automated agent. Separator 310 represents the consistent page domain security requirement that prevents the free flow of data and event information between the two frames.

By circumventing the consistent page domain security requirement, the annotation server 120 allows data to be exchanged by the frames even though they originate from different domains. (As previously described, the automated agent generally originates from the automated support server's domain and the content frame originates from the content provider's domain.) First, event information 315 can be passed from the content frame 305 to the automated agent frame 300. For example, if the end-user 105 selects a link being displayed in the content frame 305, corresponding event information 315 can be passed from the content frame 305 to the automated agent frame 300 where it is available to the annotation server 120 and the automated agent. Second, commands 320 can be passed from the annotation server 120 to the content frame 305. For example, the automated agent (or live agent) can actively guide the end-user 105 by following links being displayed in the content frame 305.

Figure 7:
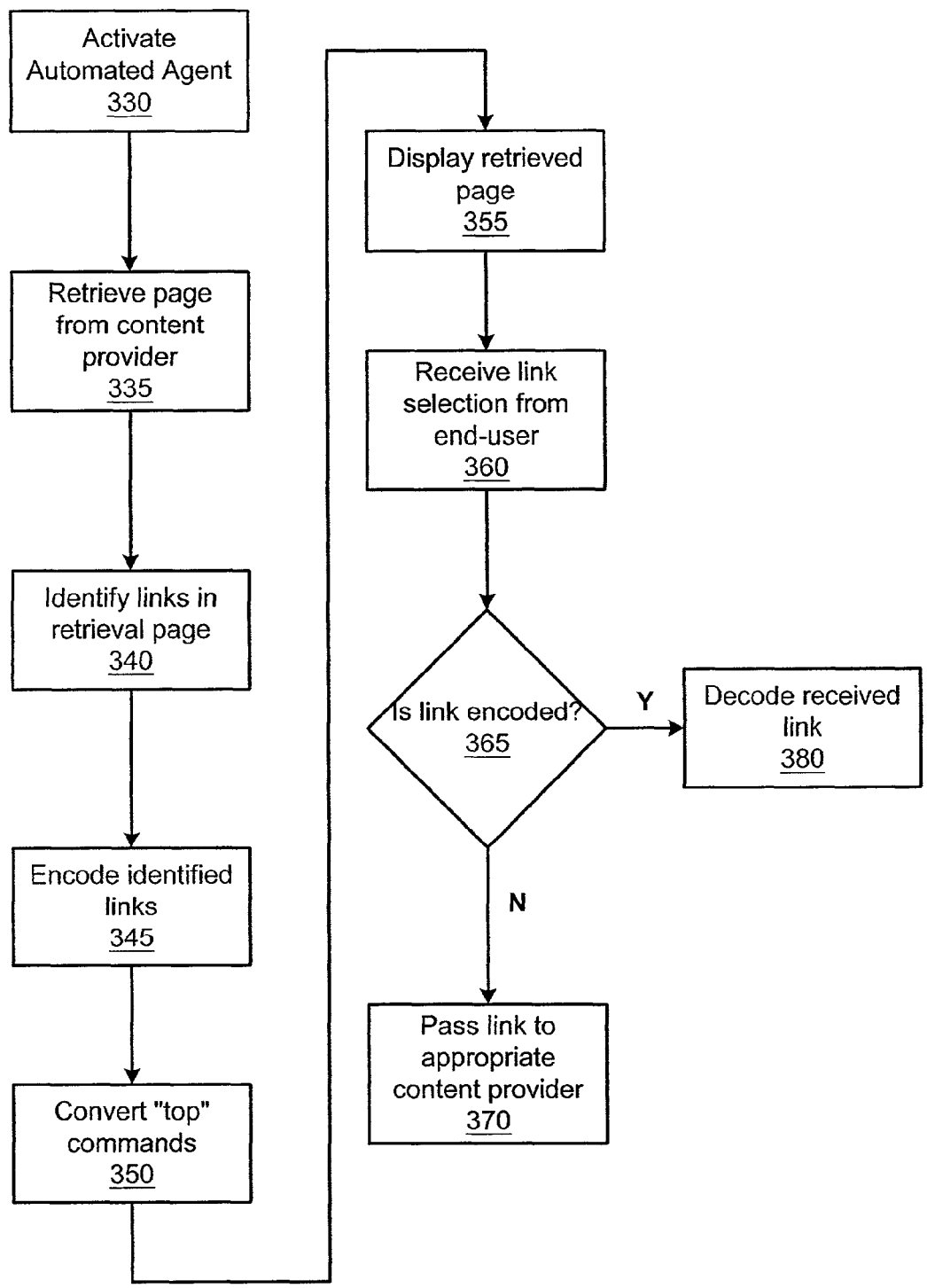
FIG. 7 is a flowchart showing one method of operating the annotation server.

The role of the annotation server 120 in enabling these two types of data exchanges is illustrated by the flowchart in FIG. 7. Initially, the end-user 105, through the browser 195, activates the automated agent (step 330). Next, the annotation server 120 retrieves from the content provider 115 the page presently being displayed in the content frame 305 and identifies each link in that retrieved page (steps 335 and 340). The annotation server 120 encodes the identifier for the retrieved page and each link in the same domain as the retrieved page to appear as if they originate from the automated support server 120. In other words, the annotation server 120 encodes the links as if they originated from the same domain as the automated agent (step 345). Any "top" commands associated with the retrieved page are converted so that the automated agent frame 300 and the content frame 305 appear simultaneously within the browser window (steps 350 and 355).

When the end-user 105 selects a link (step 360) within the content frame 305 the annotation server determines if the link is encoded (step 365). Assuming that the link was previously encoded, a corresponding fetch request 120 is sent to the annotation server 120 rather than to the content provider 115 (step 360). The annotation server 120 then decodes (step 380) the link and forwards the fetch request to the content provider 115. The content provider 115 returns the requested page to the annotation server 120 (step 335), which encodes the identifier of the returned page and identifies and encodes the appropriate links in the returned page (steps 340 and 345). When the end-user 105 selects a link that was not previously encoded, the corresponding fetch request is routed according to the link and is not necessarily routed the annotation server 120 (step 370).

In an alternate embodiment, links associated with the automated agent and its menus can be encoded so that their domain matches the domain of the content from the content provider. Moreover, encoding can be avoided if the automated agent is hosted by the content provider. In such an implementation, both the automated agent and the content could originate from the same domain.

In conclusion, the present system provides, among other things, a system and method for providing automated end-user support. Those skilled in the art, however, can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A computerized method for providing user support, the method comprising:
   (a) passing, at an end-user computer, a navigation event from a first frame originating from a first domain to a second frame originating from a second domain, wherein the first domain and the second domain are separate from the end-user computer and subject to a consistent page domain requirement, wherein the first frame comprises a set of content, wherein the set of content is masked such that it appears to originate from the second domain;
   (b) determining the present navigation location within the first frame using the navigation event;
   (c) initiating an automated help session in the second frame, the automated help session corresponding to the determined present navigation location, wherein the automated help session is provided by an automated agent through the second frame;
   (d) monitoring one or both of:
      (i) a plurality of subsequent navigation locations of the end-user within the set of content of the first frame, or
      (ii) a plurality of subsequent navigation events initiated by the end-user within the set of content of the first frame,
   wherein the act of monitoring comprises passing the one or both of a plurality of subsequent navigation locations or a plurality of subsequent navigation events to the second frame, wherein the act of monitoring is performed at least in part by the automated agent; and
   (e) displaying the first frame and the second frame in a single web page at the end-user computer.

2. The method of claim 1, further comprising:
   (a) receiving data that was collected from the end-user in the automated help session;
   (b) initiating a live help session, wherein the live help session is provided by a live human agent; and
   (c) passing the collected data to the live help session.

3. The method of claim 2, further comprising:
   (a) receiving data that was collected in the live help session; and
   (b) passing the data to the first frame.

4. The method of claim 2, further comprising:
   (a) receiving data that was collected from the end-user in the second frame; and
   (b) passing the data to the live help session.

5. The method of claim 2, further comprising:
   (a) gathering help data associated with the live help session;
   (b) updating a knowledge database with the help data; and
   (c) using the help data from the updated knowledge database in a subsequent automated help session to provide assistance to the end-user.

6. The method of claim 1, further comprising:
   (a) receiving data that was collected from an end-user in the first frame; and
   (b) passing the data collected in the first frame to the second frame.

7. The method of claim 1, wherein the first frame comprises a content frame.

8. The method of claim 1, further comprising passing a command from the automated help session to the first frame.

9. The method of claim 1, further comprising:
   (a) receiving data that was collected in the automated help session; and
   (b) passing the data to the first frame.

10. The method of claim 1, wherein the first domain is associated with a first address, wherein the second domain is associated with a second address, the method further comprising masking one or both of the first or second addresses to create an appearance that the first and second addresses are the same address.

11. The method of claim 1, further comprising receiving a request from the end-user for assistance, wherein the act of initiating an automated help session is performed in response to receiving the request from the end-user for assistance.

12. A computerized method for providing user support, the method comprising:
   (a) passing, at an end-user computer, a navigation event from a first frame of a Web page originating from a first Internet domain to a second frame of the Web page originating from a second Internet domain, wherein the first Internet domain and the second Internet domain are distinct from the end-user computer, wherein the Web page is subject to a consistent page domain requirement, wherein the first frame comprises a set of content, wherein the set of content from the first frame is masked such that the set of content appears to originate from the second domain;
(b) determining the present navigation location within the first frame using the navigation event;
(c) receiving automated help session content from the second Internet domain;
(d) providing a help session in the second frame at the end-user computer, the automated help session corresponding to the determined present navigation location, wherein the automated help session is provided by an automated agent, wherein the act of providing a help session comprises one or both of:
  (i) monitoring a plurality of subsequent navigation locations of the end-user within the set of content in the first frame, or
  (ii) monitoring a plurality of subsequent navigation events initiated by the end-user within the set of content in the first frame; and
(e) displaying the first frame and the second frame in the Web page at the end-user computer.

13. The method of claim 12, further comprising:
(a) receiving data that was collected from the user in the automated help session;
(b) initiating a live help session, wherein the live help session is provided by a live human agent; and
(c) passing the collected data to the live help session.

14. The method of claim 12, further comprising:
(a) receiving data that was collected from an end-user in the first frame; and
(b) passing the data collected in the first frame to the second frame.

15. The method of claim 12, wherein the first frame comprises a content frame.

16. The method of claim 12, further comprising passing a command from the automated help session to the first frame.

17. The method of claim 12, further comprising:
(a) receiving data that was collected in the automated help session; and
(b) passing the data to the first frame.

18. The method of claim 13, further comprising:
(a) receiving data that was collected in the live help session; and
(b) passing the data to the first frame.

19. The method of claim 13, further comprising:
(a) receiving data that was collected from the end-user in the second frame; and
(b) passing the data to the live help session.

20. A computerized method for providing user support at an end-user's computer, the method comprising:
(a) passing, at the end-user's computer, a navigation event from a first frame originating from a first Internet domain to a second frame originating from a second Internet domain, wherein the first frame and the second frame are contained within a single Web page that is subject to a consistent page domain security requirement, wherein the first frame comprises at least one link, wherein the at least one link is encoded to appear to have originated from the second domain;
(b) determining the present navigation location within the first frame using the navigation event;
(c) providing an automated help session in the second frame at the end-user's computer, the automated help session corresponding to the determined present navigation location, wherein the automated help session is provided at least in part by an automated agent, wherein the act of providing an automated help session comprises:
  (i) monitoring navigation activities of the end-user within the first frame,
  (ii) passing data from the second frame to the first frame, and
  (iii) passing data from the first frame to the second frame; and
(d) displaying the first frame and the second frame in the single Web page at the end-user computer;
wherein the end-user's computer, the first Internet domain, and the second Internet domain are separate domains.

* * * * *